UNITED STATES PATENT OFFICE.

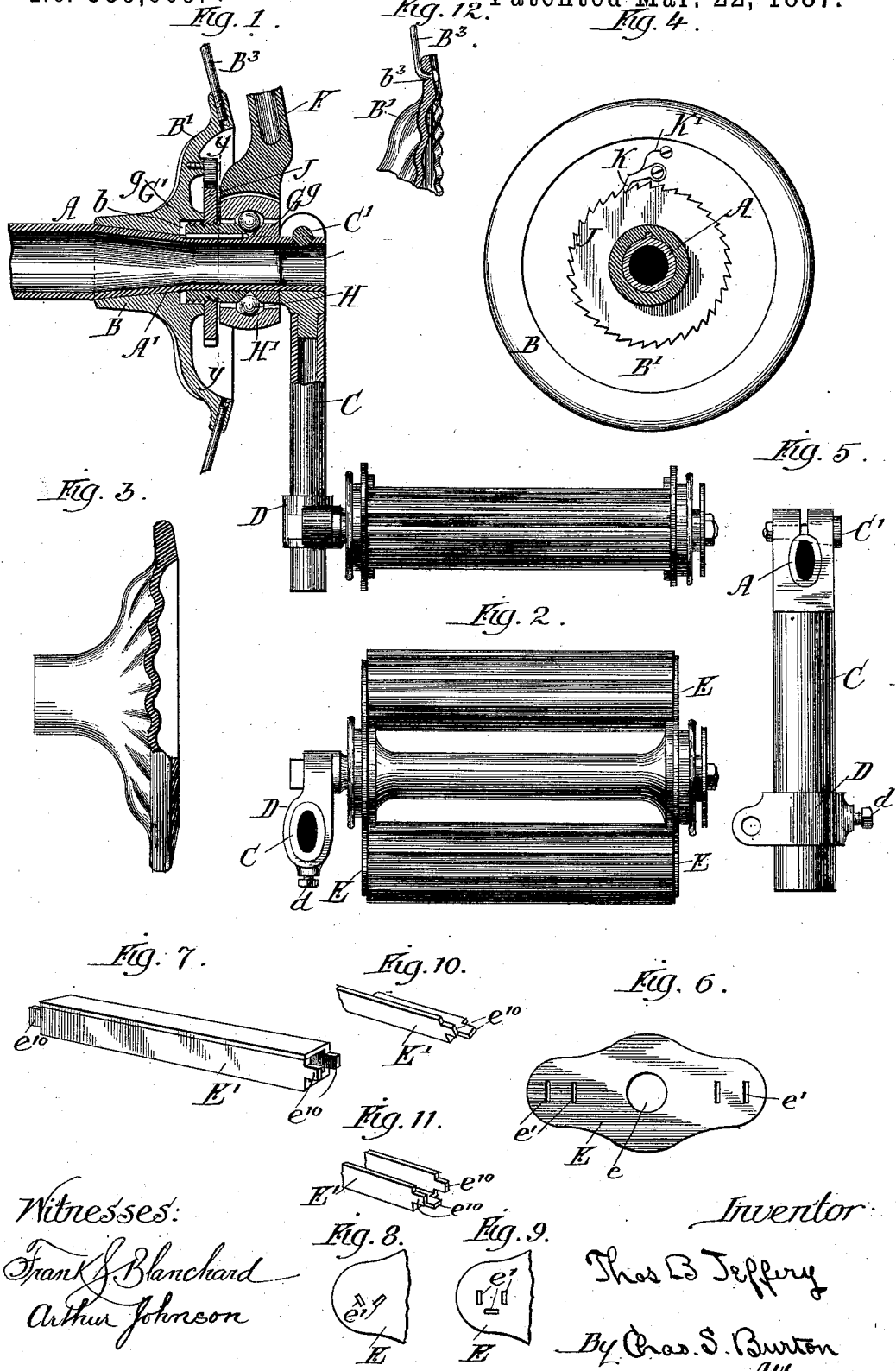

THOMAS B. JEFFERY, OF CHICAGO, ILLINOIS.

VELOCIPEDE.

SPECIFICATION forming part of Letters Patent No. 359,609, dated March 22, 1887.

Application filed August 23, 1886. Serial No. 211,604. (No model.)

*To all whom it may concern:*

Be it known that I, THOMAS B. JEFFERY, a citizen of the United States, residing at Chicago, in the county of Cook and State of Illinois, have invented certain new and useful Improvements in Velocipedes, which are fully set forth in the following specification, reference being had to the accompanying drawings, forming a part thereof.

Figure 1 is a vertical axial section through the hub and axle of a velocipede, the crank and pedal being shown in front elevations. Fig. 2 is a plan of the pedal and crank at their highest position. Fig. 3 is a sectional plan of the hub of the wheel. Fig. 4 is a section through Y Y of Fig. 1, showing the hub in side elevation. Fig. 5 is a side elevation of the pedal-crank and the clip by which the pedal is secured thereto and adjusted thereon. Fig. 6 is an elevation of one end piece of the pedal-frame. Fig. 7 is a perspective of one of the connecting cross-bars of said frame. Figs. 8 and 9 are elevations of modified forms of the end piece of the pedal-frame. Figs. 10 and 11 are perspectives of forms of the cross-bars corresponding, respectively, to Figs. 8 and 9. Fig. 12 is a detail elevation of a modified form of hub-and-spoke connection.

A is the axle, which is tubular and contracted at the tapering portion A', so that the wheel-hub B, which is correspondingly tapered interiorly, may be very firmly fastened to the axle by being forced upon this tapering portion, thus avoiding the necessity for any key device which would unequally apply the strain to the axle or tend to crush it at any point.

The hub B has its web B' made lighter than usual, and the strength thus lost is compensated by corrugating the web, as shown in Fig. 3. The end of the axle is formed elliptical, as shown in the end view of it in Fig. 5, and the pedal-crank C, being clamped onto it in the usual manner, is prevented by its elliptical form from turning thereon. The clamping-bolt C' is preferably inserted parallel with the shorter axis of the ellipse, and the elliptical portion is provided with a notch at the end of the longer axis, through which said clamping-bolt passes, and thereby prevents the crank from slipping off endwise. The clamping-bolt itself is preferably made tapering, so that as it passes into said notch it may bind tightly therein, and for the further reason that any lost motion at that point may be compensated by setting the bolt deeper.

The pedal-crank is made in two pieces, the portion which is clamped onto the axle being solid, except as to the apertures for the axle and for the clamping-bolt, and the remaining portion being tubular, for the sake of lightness, and elliptical with the shorter axis horizontal, for the sake of strength in the direction of the strain applied by the foot upon the pedal.

The pedal is secured to the pedal-crank by means of the clip D, which has an elliptical opening fitting the crank snugly, and is provided with the set-screw $d$, inserted in the direction of the longer axis of the ellipse, whereby the greatest possible resistance to its pressure is obtained.

The pedal-frame is composed of the two side bars, E E, which are made perforated, as shown in Fig. 6, the aperture $e$ being provided to admit the pedal-shaft, and the apertures $e'$ for the purpose of securing the cross-bars E', which are made hollowed and preferably angular, the form most preferred being a square tube, as shown in Fig. 7, and provided with the tongues of rivet ends $e^{10}$, two or more of which enter the aperture $e'$ in the plate B, and are headed down on the outside.

The cross-bars E' are most cheaply made of sheet metal folded into the desired form, either a single angle, as Fig. 10, or with three sides, (channel-bar,) as Fig. 11, or a square tube, as Fig. 7. Any of these forms may be constructed more cheaply than a solid bar, being cut from sheet metal, so that the tongues $e^{10}$ are formed on them without extra work, and are more secure than bars which are joined to the end pieces by a single tongue, which must necessarily be riveted more firmly, and even then is more liable to be loosened by tension than two or more riveted tongues $e^{10}$, which may be separated by considerable distance, and so grasp the end pieces more securely.

When a ball-bearing is desired for the axle, I construct it and render it adjustable as follows: F is the fork. G G' are sleeves on the axle between the hub and the pedal-crank, having their proximate ends oppositely beveled, forming a channel between them, in which are placed the anti-friction balls H, which are retained by the ball-case H'. The hub B has the recess b, into which the inner end of the inner sleeve, G', extends. Said sleeve is feathered on the axle, so that it revolves therewith but slides longitudinally thereon, and the exterior of the said sleeve is threaded, and onto it is screwed the ratchet-disk J. On the outer surface of the web of the hub B, but within the concavity of the same, is pivoted the pawl K, which overhangs the edge of the ratchet-disk J, and is adapted to engage therewith, and is provided with a spring, K', to cause it to so engage. When it is desired to tighten the ball-bearing to compensate for any lost motion, it may be done by rotating the ratchet J by the hand or any suitable tool, thereby advancing the threaded sleeve G outward toward the balls. The pawl engaging the ratchet-disk, prevents any reverse movement which would loosen the bearing.

It will be understood that the wheel is of the structure commonly known as a "suspension-wheel," the hub B being suspended from the rim by the spokes B³, which are constructed and secured to the hub in such manner (as by screwing into it) that they may be strained longitudinally to accurately center the hub and transmit the strain uniformly to the rim. The corrugation of the hub is particularly important in view of this feature of construction, since the hub is thereby stiffened to endure this strain, which is outward toward the circumference, and tends to destroy the "dish" of the hub—that is, tends to flatten it. The corrugations of the hub are formed in radial planes, and so resist the flattening tendency. When the spokes are to be screwed into the periphery of the hub, as shown in Fig. 1, the corrugation need not extend to the edge, but the edge may be thickened to receive the screw-holes for the spokes; but when extreme lightness is desired I make the hub thin throughout and corrugate it to the edge and connect the spokes by hooked ends through transverse eyes b³, as in Fig. 12.

I claim—

1. In combination with the tubular axle, tapered both exteriorly and interiorly near the end, the wheel-hub, having a tapered aperture adapted to fit such tapered axle.

2. In combination with the tubular axle rendered elliptical at the end, the pedal-crank, having an elliptical opening to fit the end of the axle.

3. In combination with the axle, the pedal-crank split and clamped thereon, the axle being notched in the line of the clamping-bolt, and the bolt lying in such notch, whereby longitudinal displacement of the crank on the axle is prevented.

4. In combination, substantially as set forth, the pedal-crank, the axle, and a key-bolt, the axle and the axle-aperture in the crank being shaped to prevent the crank turning on the axle, and the axle being notched, the key-bolt lying in such notch.

5. In combination with the axle having rigid with it the hub and the pedal-crank, the sleeves encircling the axle, having their proximate ends beveled, and the anti-friction balls between their beveled ends, and the bearing-box encircling the balls, the sleeve G being exteriorly threaded and feathered on the axle, and the ratchet-disk J, screwed onto said sleeve between the hub and the ball-bearing box, and the pawl to engage said ratchet-disk, substantially as set forth.

6. In a velocipede, a suspension-wheel having the hub provided with a rim or flange in which to secure the spokes, and having the web corrugated in radial planes between the said flange or rim and the center, substantially as set forth.

7. A velocipede-pedal comprising, in combination, substantially as set forth, the ends E and tubular cross-bars E', secured thereto.

8. A velocipede-pedal, comprising, in combination, substantially as set forth, the ends E and the square tubular cross-bars E', secured thereto.

9. A velocipede-pedal comprising, in combination, substantially as set forth, the ends E, having the central apertures for the pedal-axle and two or more non-central apertures, as e', and the cross-bars having two or more tongues, as e¹⁰, to fit the non-central apertures.

10. A velocipede-pedal comprising, in combination, substantially as set forth, the end pieces having the central pivotal aperture and the non-central rivet-apertures, and the cross-bars made of folded sheet metal with two or more tongues, as e¹⁰, to fit the rivet-apertures.

In testimony whereof I have hereunto set my hand, this 17th day of August, A. D. 1886, at Chicago, Illinois, in the presence of two witnesses.

THOS. B. JEFFERY.

Witnesses:
CHAS. S. NIEROS,
W. T. DAWSON.